US009425539B2

(12) United States Patent
Sechrist

(10) Patent No.: US 9,425,539 B2
(45) Date of Patent: Aug. 23, 2016

(54) CONICAL RETENTION RING

(71) Applicant: Tyco Electronics Corporation, Berwyn, PA (US)

(72) Inventor: Joshua Tyler Sechrist, Etters, PA (US)

(73) Assignee: Tyco Electronics Corporation, Berwyn, PA (US)

(*) Notice: Subject to any disclaimer, the term of this patent is extended or adjusted under 35 U.S.C. 154(b) by 42 days.

(21) Appl. No.: 14/444,426

(22) Filed: Jul. 28, 2014

(65) Prior Publication Data

US 2016/0023817 A1 Jan. 28, 2016

(51) Int. Cl.

| | |
|---|---|
| ***H01R 13/73*** | (2006.01) |
| ***H02B 1/01*** | (2006.01) |
| ***H01R 13/518*** | (2006.01) |
| ***H01R 13/74*** | (2006.01) |

(52) U.S. Cl.

CPC ............ *H01R 13/518* (2013.01); *H01R 13/746* (2013.01)

(58) Field of Classification Search

CPC ...... B65D 45/30; H01R 13/518; H01R 4/301; H01R 4/302; H01R 13/746; F16B 39/24

USPC ........................ 439/573, 319, 321; 292/256.6

See application file for complete search history.

(56) References Cited

U.S. PATENT DOCUMENTS 4,123,132 A * 10/1978 Hardy ..................... F16B 39/24 411/337
6,916,988 B1 7/2005 Auray et al.
7,064,273 B1 6/2006 Kiely

* cited by examiner

*Primary Examiner* — Javaid Nasri

(57) ABSTRACT

A conical retention ring is provided that includes an annular disc having a central axis, first and second major surfaces facing in substantially opposite directions along the central axis, a radially inner peripheral surface defining a central bore, a radially outer peripheral surface which is axially offset from the radially inner peripheral surface, and a spreading channel which is open from the radially outer peripheral surface to the central bore. The spreading channel allows the annular disc to spread apart to allow the central axis to receive a threaded fastener.

20 Claims, 7 Drawing Sheets

CONICAL RETENTION RING

BACKGROUND OF THE INVENTION

The subject matter herein relates generally to retention hardware for connector assemblies.

Threaded fasteners are used during mating of electrical connector assemblies. For example, in communication systems, such as network systems, servers, data centers, and the like, large printed circuit boards, known as backplanes, are used to interconnect midplanes, daughtercards, line cards and/or switch cards. The communication systems use high speed differential connectors mounted to the backplane and high speed differential connectors mounted to the line cards and switch cards to transmit signals therebetween. The threaded fasteners are used to secure or hold the mating interfaces of the connector assemblies against one another.

However, with some systems, the threaded fasteners may become unscrewed or loosen causing the mating interfaces to unseat or otherwise disrupt the transmission of signals. For example, vibration, mechanical motion, and/or temperature changes may cause the threaded fastener to loosen. Retention hardware, such as washers, may be used to prevent the threaded fastener from unscrewing. However, washers are generally placed on the threaded fastener during manufacturing, and may be difficult for an end user to add during installation. Snap rings may be added to the threaded fastener during installation for purposes of retaining the fastener or other hardware, however, snap rings do not provide a tensile force on the threaded fastener to prevent the threaded fastener from unscrewing.

A need remains for retention hardware that can be installed onto a threaded fastener to prevent the threaded fastener from becoming unscrewed.

BRIEF DESCRIPTION OF THE INVENTION

In one embodiment, a conical retention ring is provided that includes an annular disc having a central axis, first and second major surfaces facing in substantially opposite directions along the central axis, a radially inner peripheral surface defining a central bore, a radially outer peripheral surface which is axially offset from the radially inner peripheral surface, and a spreading channel which is open from the radially outer peripheral surface to the central bore. The spreading channel allows the annular disc to spread apart to allow the central axis to receive a threaded fastener.

In another embodiment, a connector system is provided that includes a panel having a plurality of mating windows therethrough. The panel has mounting holes located proximate to the mating windows. The connector system also includes a connector assembly. The connector assembly has a support frame that defines a cavity configured to receive a connector therein. The connector assembly has a threaded fastener held by the support frame. The threaded fastener is threadably coupled to one of the mounting holes to couple the connector assembly to the panel. The connector system also includes a conical retention ring coupled to the threaded fastener and positioned between the support frame and the mounting hole. The conical retention ring has an annular disc having a central axis, first and second major surfaces facing in substantially opposite directions along the central axis, a radially inner peripheral surface defining a central bore, a radially outer peripheral surface which is axially offset from the radially inner peripheral surface, and a spreading channel which is open from the radially outer peripheral surface to the central bore and configured to receive a threaded fastener therethrough. The conical retention ring is loaded onto the threaded fastener when the channel is widened such that the threaded fastener passes through the central bore. The conical retention ring is compressed when the threaded fastener is threadably coupled to the mounting hole.

In another embodiment, a connector system is provided that includes a threaded fastener coupled to a support frame of a connector assembly. The threaded fastener is threadably coupled to a mounting hole of a panel. The connector system also includes a conical retention ring coupled to the threaded fastener and positioned between the support frame and the mounting hole. The conical retention ring has a central bore and a spreading channel open to the central bore. The conical retention ring is loaded onto the threaded fastener when the channel is widened such that the threaded fastener passes through the central bore. The conical retention ring has an inclined surface configured to deform to become substantially planar when the threaded fastener is threadably coupled to the mounting hole.

DETAILED DESCRIPTION OF THE INVENTION

Figure 1:
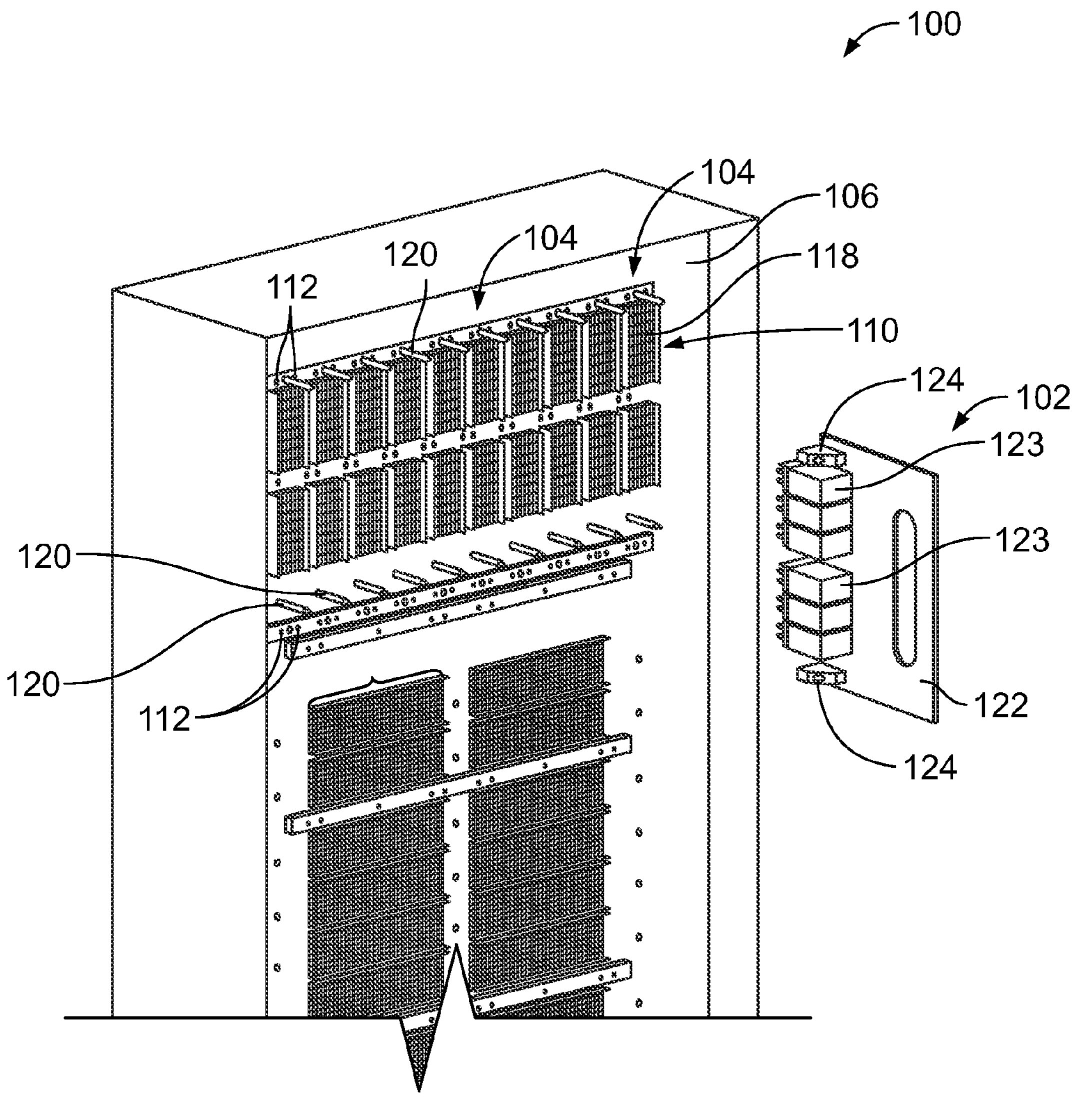
FIG. 1 is a front perspective view of a connector system formed in accordance with an exemplary embodiment.

FIG. 1 is a front perspective view of a connector system 100 formed in accordance with an exemplary embodiment. The connector system 100 may be used in a data communication application, such as a network switch. The connector system 100 may be used as part of a backplane system, such as a cable backplane system, and thus may be referred to hereinafter as a backplane system 100 or a cable backplane system 100. The connector system 100 may be electrically connected to a mating connector assembly 102, such as a line card, a switch card, another type of mating connector mounted to a circuit board or another type of mating connector assembly.

The connector system 100 includes one or more connector assemblies 104, also referred to as connector bricks 104 that are mounted to a panel 106. In an exemplary embodiment, the connector assemblies 104 are cable connector assemblies having a plurality of electrical cables 108 (shown in FIG. 2) associated therewith, and thus may be referred to hereinafter as cable connector assemblies 104. In alternative embodiments, rather than being cable connector assemblies, the connector assemblies may be terminated to circuit boards, such as a backplane.

The panel 106 includes a plurality of mating windows 110. A portion of each of the cable connector assemblies 104 is exposed through a respective mating window 110. The mating window 110 permits one of the cable connector assemblies 104 to be presented for engaging one of the corresponding mating connector assemblies 102. The panel 106 may receive a portion of the mating connector assembly 102 through the mating window 110.

The panel 106 supports the components of the connector assembly 104. The panel 106 may include a chassis, a rack, a cabinet, or other suitable structures for holding the connector assembly 104 and for mating with the mating connector assembly 102. The panel 106 includes mounting holes 112 positioned proximate to each of the mating windows 110. The mounting holes 112 are configured to receive a threaded fastener 114 (shown in FIG. 4) coupled to the connector assembly 104. The mounting holes 112 are threaded. Optionally, the mounting holes 112 may be part of a mounting block coupled to the panel 106. When driven to an engaged position, the threaded fastener 114 holds the connector assembly 104 against the panel 106 to allow the mating connector assembly 102 to mate with the connector assembly 104. In an exemplary embodiment, a conical retention ring 116 (shown in FIG. 4) is coupled to the threaded fastener 114. The conical retention ring 116 is configured to apply a preload force on the threaded fastener 114 to prevent the threaded fastener 114 from disengaging or becoming unscrewed. Accordingly, the conical retention ring 116 may prevent the connector assembly 104 from becoming unseated or disconnected from the mating connector assembly 102. The conical retention ring 116 is configured to be loaded onto the threaded fastener 114 when the conical retention ring is spread open, as discussed below. The panel 106 may include structures for guiding, supporting and/or securing the mating connector assembly 102 to the connector assembly 104.

Each connector assembly 104 includes one or more connectors 118, which may be interconnected by the cables 108 (shown in FIG. 2) or by a circuit board (not shown), within the connector system 100. When embodied as cable connectors 118, the cable connector assemblies 104 eliminate interconnections via traces of a circuit board, such as a backplane circuit board, and instead interconnect various cable connectors 118 with the cables 108. The cable connector assemblies 104 may improve signal performance along the signal paths between various connectors of the cable backplane system 100 as compared to conventional backplanes. For example, the cable connector assemblies 104 support higher speeds, longer signal path lengths and lower cost per channel as compared to conventional backplanes. The connector assemblies 104 may provide shielding of signal lines for improved signal performance. The connector assemblies 104 may be packaged in a structure, such as the rack assembly 132 shown in FIG. 3, which allows accurate connector 118 location for mating with the corresponding mating connector assemblies 102. The connector assemblies 104 include guide pins 120 that are used to locate the connectors 118 and the corresponding mating connector assemblies 102 during mating.

The mating connector assembly 102 includes a circuit board 122 and a plurality of mating connectors 123 mounted thereto. When the mating connector assembly 102 is mated with the connector assembly 104, the connector 118 is electrically and mechanically connected to one of the mating connectors 123. The mating connector assembly 102 may also include mounting blocks 124. The mounting blocks 124 have openings that receive the guide pins 120 therein. The guide pins 120 guide mating of the mating connector assembly 102 and the connector assemblies 104. Alternatively, the mounting blocks 124 may receive the threaded fastener 114 to secure the mating connector assembly 102 to the connector assembly 104.

Figure 2:
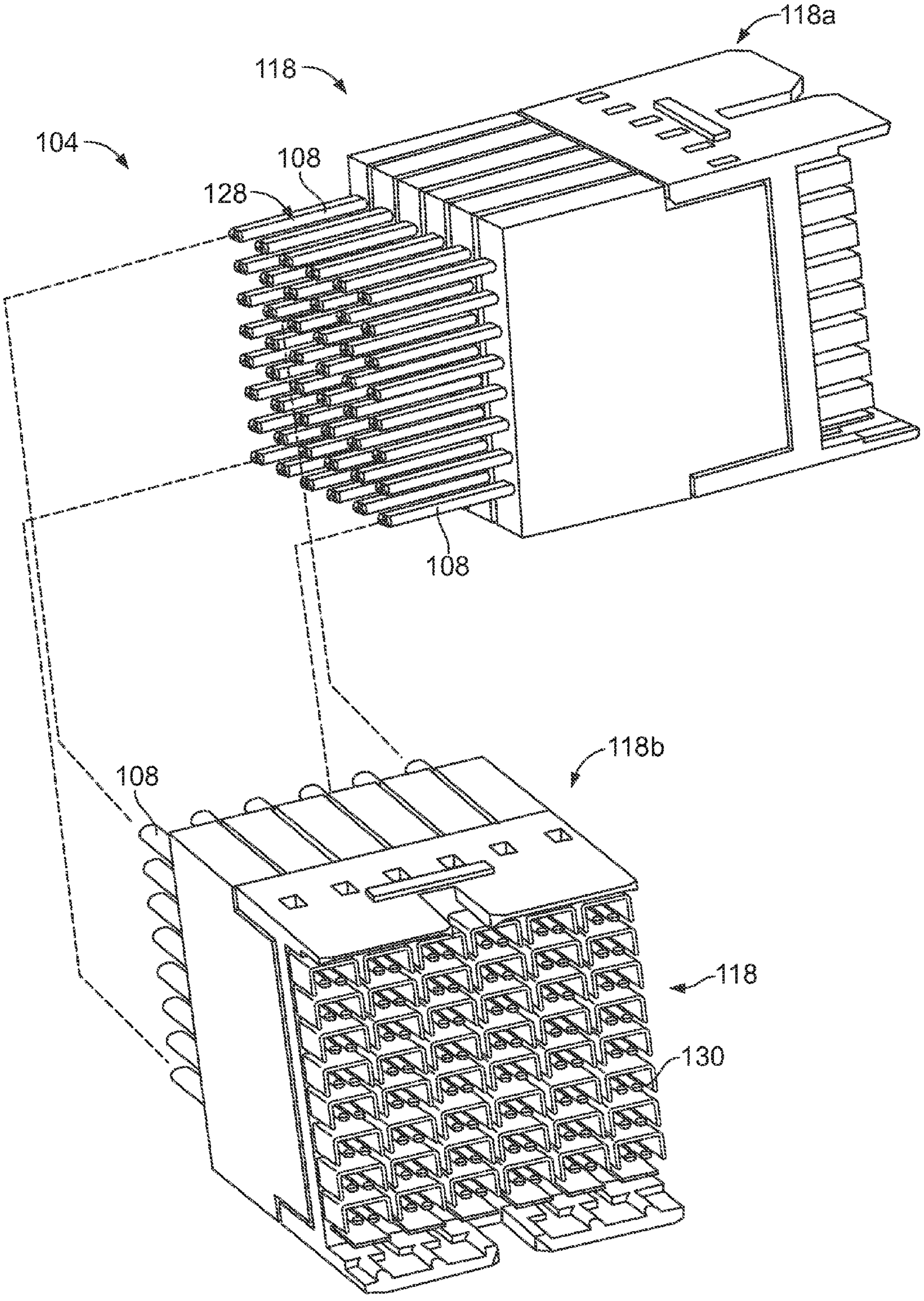
FIG. 2 illustrates cable connectors of the connector system formed in accordance with an exemplary embodiment.

FIG. 2 illustrates a portion of the cable connector assembly 104 formed in accordance with an exemplary embodiment. The cable connector assembly 104 includes the cable connectors 118, which may be referred to hereinafter as first and second cable connectors 118*a*, 118*b*, respectively, and a cable bundle 128 between the cable connectors 118. The cable connectors 118 are provided at ends of the cable bundle 128. The cable bundle 128 includes the plurality of cables 108. Optionally, the cable connectors 118 may be identical to one another. The cable connectors 118 may define header connectors. In an exemplary embodiment, the cable connector 118 is a high speed differential pair cable connector that includes a plurality of differential pairs of conductors, such as signal contacts 130, mated at a common mating interface. The differential conductors are shielded along the signal paths thereof to reduce noise, crosstalk and other interference along the signal paths of the differential pairs.

Figure 3:
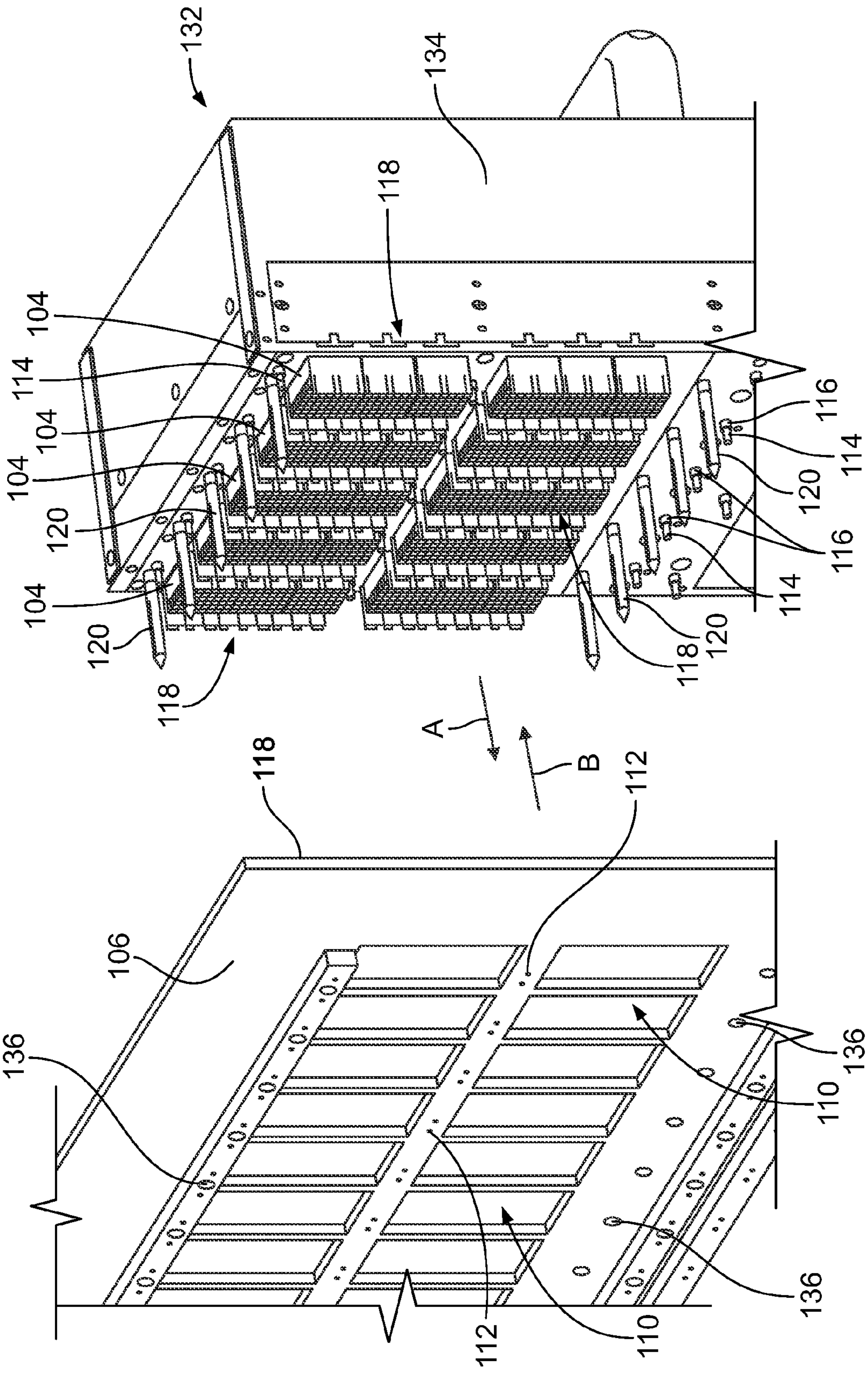
FIG. 3 is a front perspective view of a rack assembly poised for mating to a panel formed in accordance with an exemplary embodiment.

FIG. 3 is a front perspective view of a rack assembly 132 poised for mounting to the panel 106. The rack assembly 132 includes a plurality of the connector assemblies 104 that are held together by a common chassis 134.

The panel 106 includes a variety of openings that permit elements of the connector assemblies 104 to pass therethrough. For example, the panel 106 includes the mating windows 110, guide holes 136, and the mounting holes 112. The mating windows 110 are configured to receive portions of the cable connectors 118 therethrough. The guide holes 136 are configured to receive the guide pins 120 therethrough.

Each of the mounting holes 112 is configured to receive one of the threaded fasteners 114 therein. The mounting holes 112 may have complementary threads that mate with a threaded portion 152 (shown in FIG. 4) of the threaded fastener 114 such that the threaded fastener 114 and the mounting holes 112 create a threaded connection therebetween. For example, the threaded fastener 114 may be configured as a jackscrew to draw the connector assembly 104 closer to the panel 106 as the threaded fastener 114 is tightened to secure the connector assembly 104 to the panel 106.

In the illustrated embodiment, the conical retention ring 116 is coupled to the threaded fastener 114. The conical retention ring 116 is positioned between the panel 106 and the connector assembly 104 as is discussed below. When the connector assembly 104 is secured to the panel 106, the threaded fastener 114 is tightened or driven to cause the connector assembly 104 to approach the panel 106 as indicated by the arrow A. As described below, the conical retention ring 116 deforms to apply a preload force on the threaded fastener 114 in a direction B that is opposite of A. The preload force causes the threaded fastener 114 to resist further rotation, movement, and/or disengagement.

Figure 4:
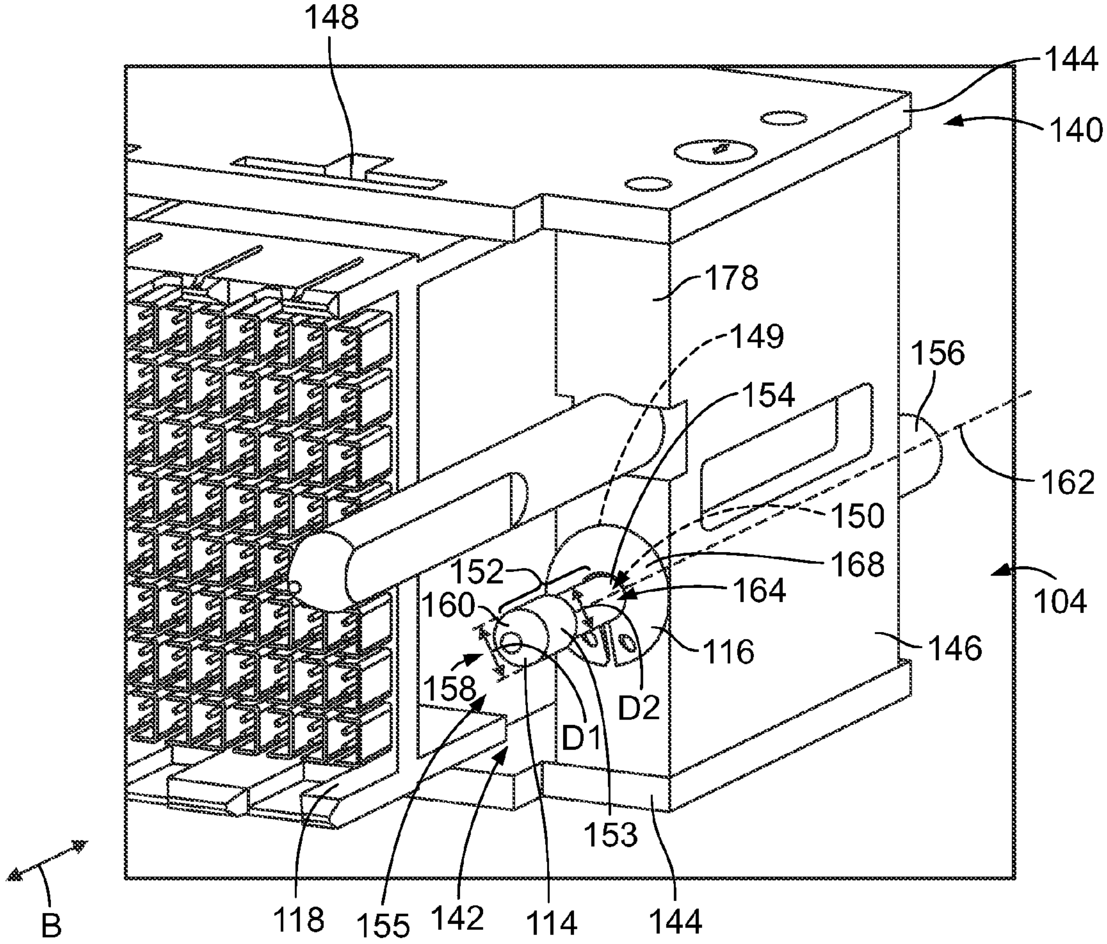
FIG. 4 is a front perspective view of a portion of a cable connector assembly formed in accordance with an exemplary embodiment.

FIG. 4 is a front perspective view of a portion of the cable connector assembly 104. The connector assembly 104 includes a support frame 140 defining a cavity 142. The cable connectors 118 are positioned in the cavity 142. Any number of cable connectors 118 may be held in the cavity 142.

The support frame 140 includes side walls 144 and spacers 146 between the side walls 144. As illustrated, one first end of the connector assembly 104 is shown. An opposite end may include similar components as described in relation to the first end. For example, the opposite end may include a second spacer 146 between the side walls 144. Each spacer 146 has an outer surface 178 that faces the panel 106 (shown in FIG. 3) when the cable connector assembly 104 is poised for mating. The cavity 142 is defined between the side walls 144 and between the spacers 146. In an exemplary embodiment, the side walls 144 include slots 148 that receive lugs (not shown) extending from the housings of the cable connectors 118. The slots 148 may be oversized to allow a limited amount of floating movement of the cable connectors 118 relative to the support frame 140, such as to allow the cable connectors 118 a range of movement for aligning with the mating connectors of the mating connector assembly 102 (shown in FIG. 1) during mating.

The threaded fastener 114 is coupled to the spacer 146 and extends through the spacer 146. The threaded fastener 114 extends through an opening 149 extending through the spacer 146. In an exemplary embodiment, the threaded fastener 114 is allowed to rotate freely relative to the spacer 146, such as within a bore 150 through the spacer 146. The threaded fastener 114 may be any threaded fastener configured to secure the cable connector assembly 104 to the panel 106 (shown in FIG. 1).

The threaded fastener 114 includes the threaded portion 152, a shaft 154, and a drive portion 156 opposite the threaded portion 152. The threaded portion 152 has threads 153 that extend from the shaft 154, such as at or near an end 155 of the fastener 114. In the illustrated embodiment, the threaded portion 152 terminates to a tip 158 having a chamfered or beveled edged 160. The edge 160 may be beveled to encourage alignment of the threaded fastener 114 with the bore 150 and with the mounting hole 112 (shown in FIG. 3). The threaded portion 152 has a thread diameter D1 that extends through the threads 153.

The shaft 154 extends between the threaded portion 152 and the drive portion 156. The shaft 154 may have a smooth surface and a shaft diameter D2 that extends along the shaft 154. The shaft diameter D2 is less than the diameter D1 of the threaded portion. As such, the shaft 154 is narrower than the threaded portion 152. When the threaded fastener 114 is coupled to the spacer 146, the shaft 154 extends to and through the bore 150. The shaft 154 terminates to the drive portion 156. The drive portion 156 is configured to turn the threaded fastener 114 along a body axis 162. For example, the drive portion 156 may include a knurled portion (not shown) and/or a head configured to be driven by a drive tool (not shown).

In an exemplary embodiment, the conical retention ring 116 is loaded onto the shaft 154 of the threaded fastener 114, as will be discussed below. The retention ring 116 may be loaded onto the threaded fastener 114 after the threaded fastener 114 has been coupled to the spacer 146. As such, the retention ring 116 may be coupled to the threaded fastener 114 without removing the threaded fastener 114 from the spacer 146. The retention ring 116 is positioned between the threaded portion 152 and the spacer 146. Alternatively, the retention ring 116 may be positioned between the drive portion 156 and the spacer 146.

Figure 5:
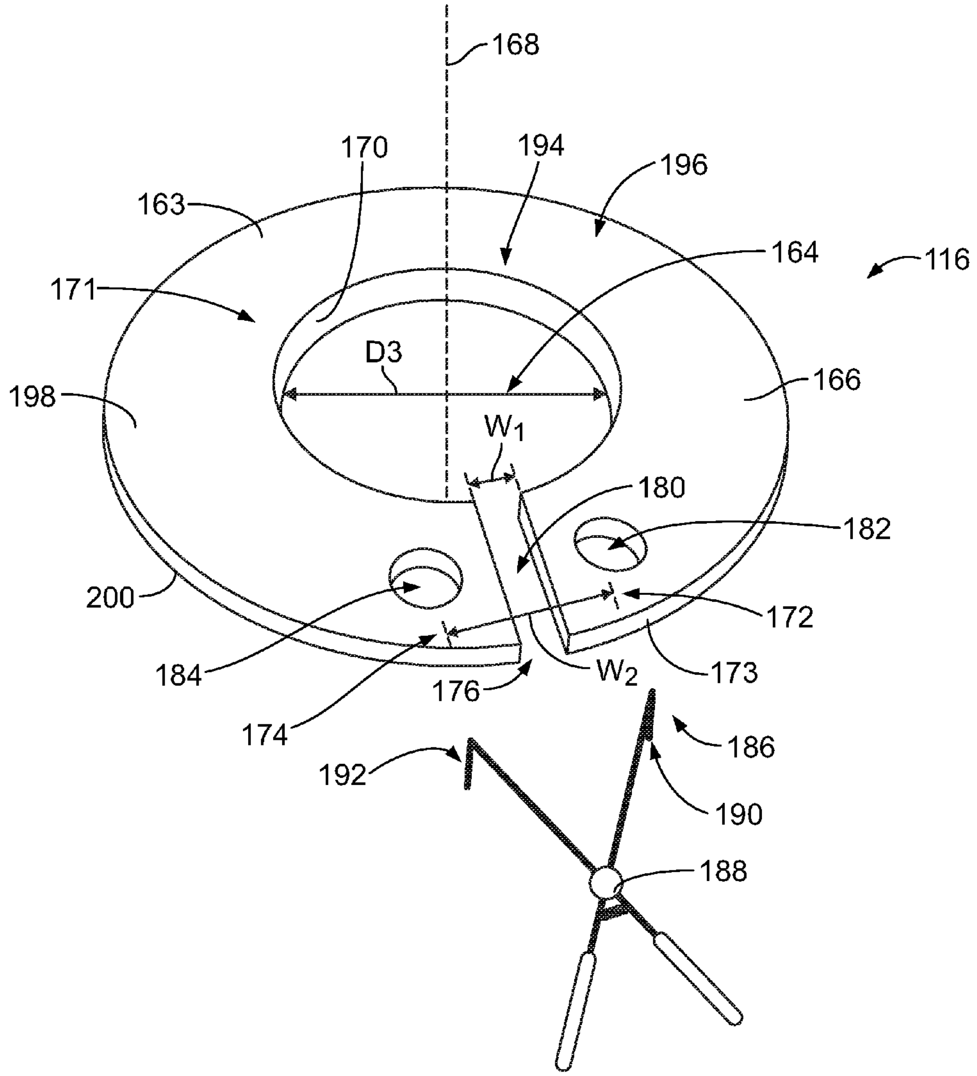
FIG. 5 is a perspective view of a conical retention ring formed in accordance with an exemplary embodiment.

FIG. 5 is a perspective view of the conical retention ring 116. The retention ring 116 includes an annular disk 163, which may be generally C-shaped, having a central bore 164 (also shown in FIG. 4) partially circumferentially surrounded by an inclined surface 166. The bore 164 passes through, and is aligned with, a central axis 168. The central axis 168 is generally parallel with the body axis 162 (shown in FIG. 4) when the retention ring 116 is mounted on the threaded fastener 114. The bore 164 has a bore diameter D3 defined by an inside face defining a radially inner peripheral surface 170 of the inclined surface 166. The radially inner peripheral surface 170 extends around an inner perimeter 171 of the inclined surface 166. The bore diameter D3 is greater than the shaft diameter D2 (shown in FIG. 4), but is narrower than the thread diameter D1 (shown in FIG. 4), and as such, the retention ring 116 cannot be removed in an axial direction from the threaded fastener 114 because the threaded portion 152 will stop removal. The conical retention ring 116 has a radially outer peripheral surface 173 that is axially offset from the radially inner peripheral surface 170 at the outer edge.

The conical retention ring 116 has a first end 172 and a second end 174 spaced apart by a gap 176 therebetween. The first and second ends 172, 174, respectively, oppose each other at a spreading channel 180. The spreading channel 180 extends between the radially inner peripheral surface 170 and the radially outer peripheral surface 173. The gap 176 defines the spreading channel 180 and when the spreading channel 180 is spread open, the gap is widened and the bore 164 is widened, which allows the conical retention ring to pass onto the threaded fastener 114 (shown in FIG. 4). In an exemplary embodiment, the bore 164 is widened enough that the conical retention ring 116 is able to pass over the threaded portion 152 of the threaded fastener 114. Alternatively, the conical retention ring 116 may be side-loaded over the side of the threaded fastener 114 rather than being loaded over the end of the threaded fastener 114 when the spreading channel 180 is spread apart. When the retention ring 116 is being loaded onto the threaded fastener 114, the ends 172, 174 are pulled apart from one another to increase a channel or gap width between the ends 172, 174 to a gap width that corresponds to a bore width greater than the thread diameter Dl to load the threaded fastener 114 through the bore 164. The gap 176 has a resting gap width W1 that represents a natural gap width when the ends 172, 174 are not pulled apart. The resting gap width W1 is less than the shaft diameter D2 (shown in FIG. 4), and as such, the spreading channel 180 is narrower than the shaft 154 (shown in FIG. 4). Thus, the retention ring 116 cannot be inadvertently removed in a radial direction from the threaded fastener 114.

When the conical retention ring 116 is loaded onto the threaded fastener 114, the conical retention ring 116 is elastically deformed to allow the threaded fastener 114 to pass through the bore 164 in an axial direction. As such, the first end 172 and the second end 174 are spread apart a width W2 (shown in phantom) that that corresponds to a bore diameter that is greater than the thread diameter D1. In other words, the gap width is increased to a gap width W2 to widen the bore 164 and allow the threaded fastener 114 to pass through the bore 164. When the threaded fastener 114 is received in the bore 164, the ends 172, 174 are released and return to the resting gap width W1. The conical retention ring 116 may be sufficiently resilient to allow the conical retention ring 116 to deform. The conical retention ring 116 may be made of any sufficiently elastic material. For example, the conical retention ring 116 may be made of a metal material, a plastic material, and/or the like. After the conical retention ring 116 is loaded onto the threaded fastener 114, the conical retention ring 116 is free to linearly and rotationally move about the shaft 154 (shown in FIG. 4), but is bound between the threaded portion 152 (shown in FIG. 4) and an outer surface 178 (shown in FIG. 4) of the spacer 146 (shown in FIG. 4).

In the illustrated embodiment, the conical retention ring 116 includes engagement holes 182 and 184. The engagement hole 182 is situated proximate to the first end 172. The engagement hole 184 is situated proximate to the second end 174. The engagement holes 182, 184 may extend through the inclined surface 166. The engagement holes 182, 184 are configured to receive a head 186 of an engagement tool 188. For example, the head 186 may include a first prong 190 sized and shaped to be received in the first engagement hole 182, and a second prong 192 sized and shaped to be received in the second engagement hole 184. The engagement tool 188 is configured to enable a user to spread the first and second ends 172, 174 apart to widen the spreading channel 180 to allow the threaded fastener 114 to pass therethrough. In other embodiments, other arrangements are possible. For example, the ends 172, 174 may include flanges (not shown) configured to receive the head 186 of the engagement tool 188.

The conical retention ring 116 is generally cone like having a frusto-conical shape. The general shape of the retention ring 116 may be similar to a cone-disc spring, also generally known as a Belleville washer. The inclined surface 166 extends between a central portion 194 and an outer portion 196. The central portion 194 includes the inside face 170. The inclined surface 166 includes a first side defining a first major surface 198 and a second side defining a second major surface 200, both extending from the central portion 194 to the outer portion 196 along opposite sides of the retention ring 116. The first and second sides 189, 200 generally face in opposite directions along the central axis 168.

Figure 6:
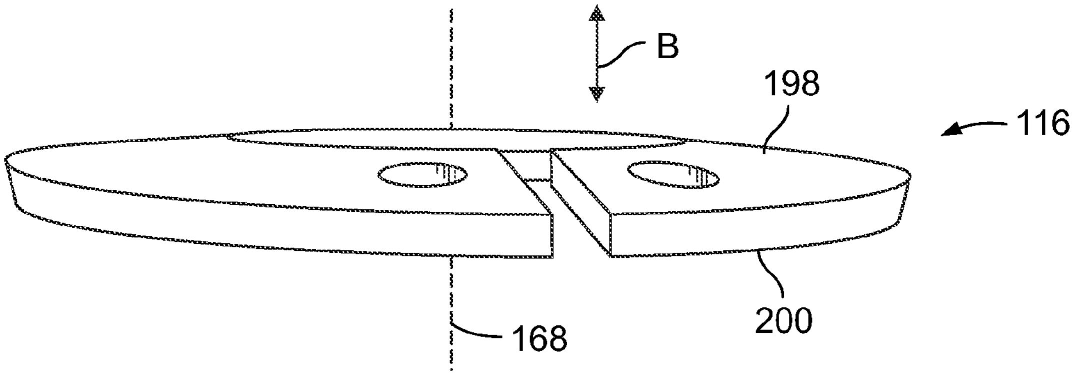
FIG. 6 is a side perspective view of a conical retention ring in a compressed state formed in accordance with an embodiment.
Figure 7:
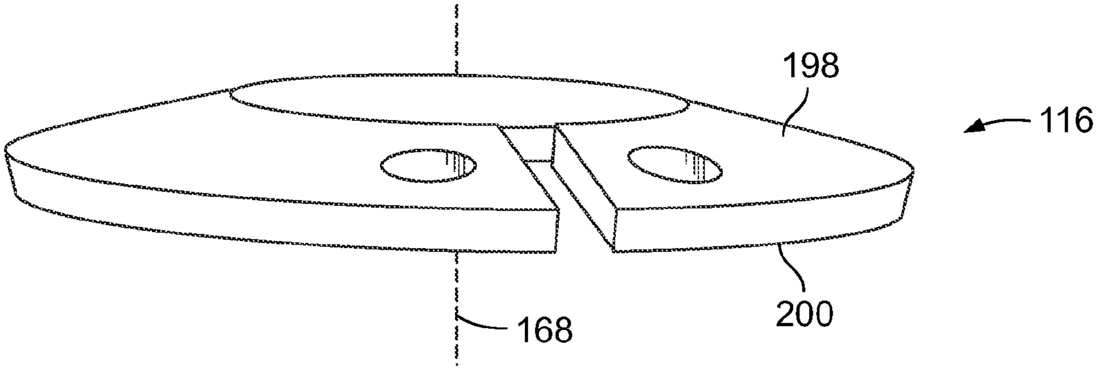
FIG. 7 is a side perspective view of a conical retention ring in a normal state formed in accordance with an embodiment.

FIG. 6 is a side perspective view of the conical retention ring 116 in the compressed state. FIG. 7 is a side perspective view of the conical retention ring 116 in a normal state. The retention ring 116 has a flatter shape in the compressed state than in the normal state. In the normal state, the first and second sides 198, 200 are angled such that the first and second sides 192, 200 are oblique relative to the central axis 168. Thus, the inclined surface 116 is inclined forming the conic section described above. The conical retention ring 116 is compressed as the threaded fastener 114 (shown in FIG. 4) is driven into the mounting hole 112 (shown in FIG. 3). For example, the retention ring 116 may compress as the first side 198 abuts the panel 106 (shown in FIG. 3), and the second side 200 abuts the outer surface 178 (shown in FIG. 4) of the spacer 146 (shown in FIG. 4). When the threaded fastener 114 is approximately fully engaged with the mounting hole 112, the retention ring 116 may enter a fully compressed state such as shown in FIG. 6. In the fully compressed state, the inclined surface 166 deforms to become substantially planar such that the first and second sides become generally perpendicular to the central axis 168.

As the retention ring 116 is compressed, the retention ring 116 exerts a preload force on the threaded fastener 114 (shown in FIG. 4), indicated by arrow B (also shown in FIG. 4). When compressed, the inclined surface 116 deforms acting as a linear spring. The retention ring 116 applies the preload force on the surface of the spacer 146 (shown in FIG. 4) and on the panel 106 (shown in FIG. 1), which in turn applies a force to the fastener 114 which is engaged in the mounting hole 112. The retention ring applies equal and opposite forces. The preload force applies tension on the threaded fastener 114 to prevent the threaded fastener 114 from disengaging from, or rotating relative to the mounting hole 112 (shown in FIG. 3). Additionally, the preload force may compensate for any loosening of the threaded fastener 114. Optionally, a plurality of retention rings 116 may be loaded onto the threaded fastener 114 to achieve a desired preload force.

Figure 8:
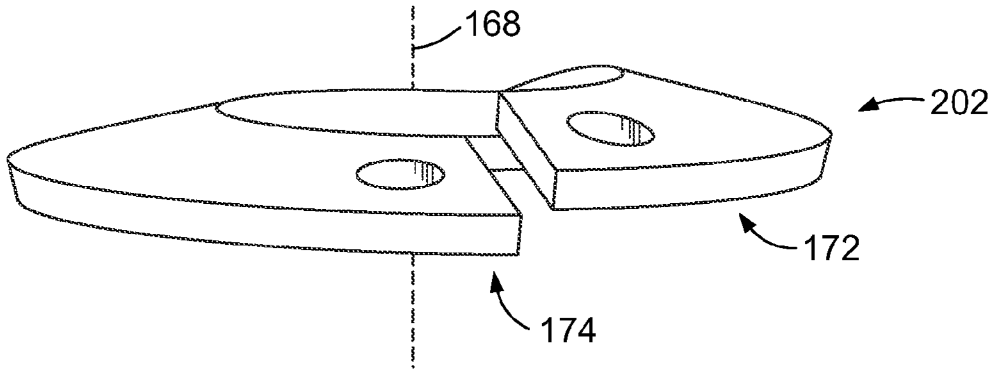
FIG. 8 is a perspective view of a conical retention ring being helically wound formed in accordance with an embodiment.

FIG. 8 is a perspective view of an embodiment of a conical retention ring 202 that is helically wound. The retention ring 202 is similar to the retention ring 116 and like components are identified with like reference numerals. The retention ring 202 is helically wound such that the first and second ends 172, 174, respectively, are offset axially along the central axis 168. For example, the first end 172 may be translated forward in the direction of the central axis 168 relative to the second end 174. The retention ring 202 may be helically wound to provide a greater compression distance and/or a greater spring constant thereby increasing the amount of preload force applied as the retention ring 202 is compressed.

Figure 9:
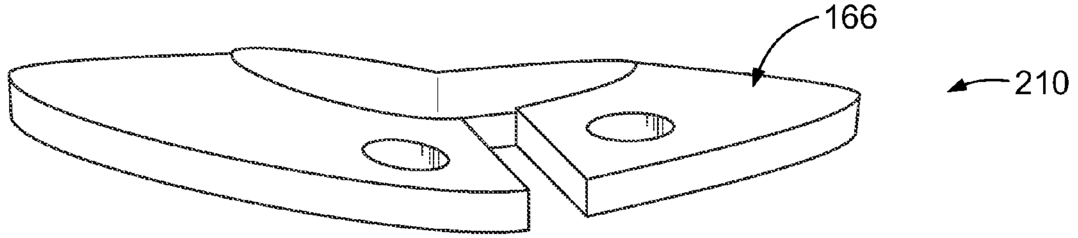
FIG. 9 is a perspective view of a conical retention ring having a wave pattern formed in accordance with an embodiment.

FIG. 9 is a perspective view of an embodiment of a conical retention ring 210 having a wave pattern. The retention ring 210 is similar to the retention ring 116 and like components are identified with like reference numerals. As illustrated, the inclined surface 166 has a wave pattern such that the inclined surface 166 is sinusoidally translated around a circumference of the inclined surface 166. The wave pattern may provide a greater spring constant thereby increasing the amount of preload force applied as the retention ring 210 is compressed.

Figure 10:
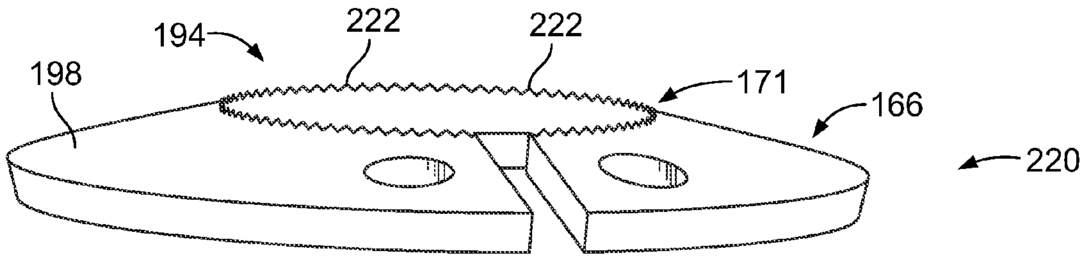
FIG. 10 is a perspective view of a conical retention ring having teeth along a central portion formed in accordance with an embodiment.
Figure 11:
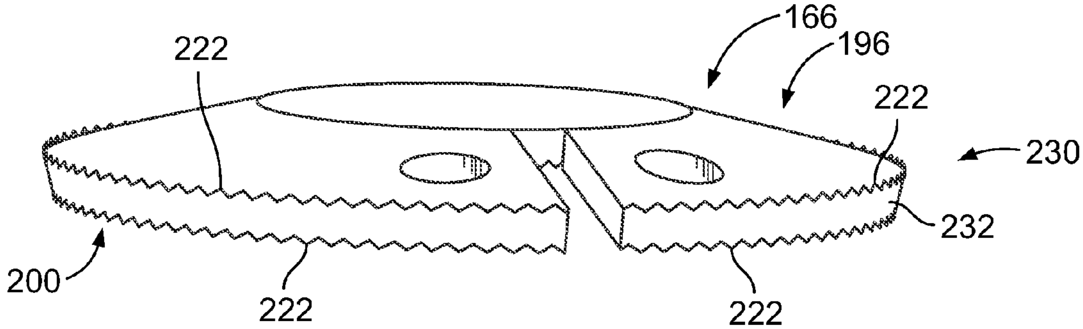
FIG. 11 is a perspective view of a conical retention ring having teeth along an outer portion formed in accordance with an embodiment.

FIG. 10 is a perspective view of an embodiment of a conical retention ring 220 having an array of teeth 222 extending along the central portion 194. The teeth 222 extend around the inner perimeter 171 of the retention ring 220. FIG. 11 is a perspective view of an embodiment of a conical retention ring 230 having an array of teeth 222 extending along the outer portion 196. The teeth 222 extend around an outer perimeter 232 of the retention ring 230. The retaining rings 220, 230 are both similar to the retention ring 116 and like components are identified with like reference numerals. The teeth 222 provide increased friction between the conical retention rings 220, 230 and contact surfaces. For example the teeth 222 of the conical retention ring 220 provides increased friction between the panel 106 (shown in FIG. 1) and the first side 198 of the retention ring 220. The teeth 222 of the conical retention ring 230 may also provide increased friction between the outer surface 178 (shown in FIG. 4) of the spacer 146 (shown in FIG. 4) and the second side 200 of the retention ring 230. In certain embodiments, both the central portion 194 and the outer portion 196 may include teeth 222. In the illustrated embodiment, the teeth 222 protrude along both sides 198,200 of the inclined surface 166, but in other embodiments, the teeth 222 may protrude from only one of the sides 198 or 200. The increased friction may prevent the threaded fastener 114 from becoming unscrewed or loosed once tightened. For example, the teeth 222 may dig into a portion of the outer surface 178 of the spacer 146 and the panel 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A conical retention ring comprising:

a conically-shaped annular disc having a central axis, first and second major surfaces facing in substantially opposite directions along the central axis, a radially inner peripheral surface defining a central bore, a radially outer peripheral surface which is axially offset from the radially inner peripheral surface, and a spreading channel which is open from the radially outer peripheral surface to the central bore, the spreading channel allowing the annular disc to spread apart to allow the central axis to receive a threaded fastener.

2. The conical retention ring of claim 1, wherein the annular disc has an inclined surface radially between the radially outer peripheral surface and the radially inner peripheral surface.

3. The conical retention ring of claim 2, wherein the inclined surface deforms to become substantially planar when the threaded fastener is coupled in a corresponding mounting hole.

4. The conical retention ring of claim 1, wherein the annular disc is C-shaped.

5. The conical retention ring of claim 1, wherein the first and second major surfaces are angled non-perpendicular to the central axis.

6. The conical retention ring of claim 1, wherein the annular disc is movable between a normal state and a compressed state, the annular disc having a flatter shape in the compressed state than in the normal state.

7. The conical retention ring of claim 1, wherein the annular disc further comprises a pair of engagement holes situated on opposite sides of the spreading channel, the engagement holes configured to receive a head of an engagement tool, the engagement tool configured to widen the spreading channel to widen the bore and allow the conical retention ring to be loaded onto the threaded fastener.

8. The conical retention ring of claim 1, wherein the annular disc further comprises a first end and a second end opposing each other at the spreading channel, the first end and the second end being spaced apart by a gap defining the spreading channel.

9. The conical retention ring of claim 8, wherein the annular disc is helically wound such that the first and second ends are axially offset relative to one another.

10. The conical retention ring of claim 1, wherein the annular disc includes a wave pattern extending around a circumference thereof.

11. The conical retention ring of claim 1, wherein the annular disc includes an array of teeth.

12. A connector system comprising:

a panel having a plurality of mating windows therethrough, the panel having mounting holes located proximate to the mating windows;

a connector assembly having a support frame defining a cavity configured to receive a connector therein, the connector assembly having a threaded fastener held by the support frame, the threaded fastener being threadably coupled to one of the mounting holes to couple the connector assembly to the panel; and a conical retention ring coupled to the threaded fastener and positioned between the support frame and the panel, the conical retention ring having a conically-shaped annular disc having a central axis, first and second major surfaces facing in substantially opposite directions along the central axis, a radially inner peripheral surface defining a central bore, a radially outer peripheral surface which is axially offset from the radially inner peripheral surface, and a spreading channel which is open from the radially outer peripheral surface to the central bore, the spreading channel allowing the annular disc to spread apart to allow the central axis to receive the threaded fastener, the spreading channel being spread apart to widen the central bore to allow the conical retention ring to be loaded onto the threaded fastener into the central bore, the conical retention ring being compressed when the threaded fastener is threadably coupled to the mounting hole.

13. The connector system of claim 12, wherein the conical retention ring includes an inclined surface between the radially outer peripheral surface and the radially inner peripheral surface.

14. The connector system of claim 13, wherein the inclined surface deforms to become substantially planar when the threaded fastener is is fully engaged with the mounting hole.

15. The connector system of claim 12, wherein the conical retention ring is C-shaped.

16. The connector system of claim 12, wherein the first and second major surfaces are angled non-perpendicular to the central axis.

17. The connector system of claim 12, wherein the conical retention ring is movable between a normal state and a compressed state, the conical retention ring having a flatter shape in the compressed state than in the normal state.

18. The connector system of claim 12, wherein the threaded fastener has threads at an end of a shaft of the threaded fastener, the threaded fastener has a thread diameter through the threads and a shaft diameter through the shaft narrower than the thread diameter, the central bore of the conical retention ring having a bore diameter narrower than the thread diameter.

19. The connector system of claim 18, wherein the spreading channel has a channel width narrower than the shaft diameter, the conical retention ring being elastically deformed and spread apart to widen the bore to load the threaded fastener therethrough.

20. The connector system of claim 12, wherein the support frame includes spacers with a bore extending therein, the threaded fastener extending to and through the bore.

* * * * *